(12) United States Patent
McPherson et al.

(10) Patent No.: US 6,179,905 B1
(45) Date of Patent: Jan. 30, 2001

(54) CORRUGATION ADHESIVE, CORRUGATED BOARD, AND PREPARATION METHODS THEREFOR

(75) Inventors: Roger McPherson, Muscatine, IA (US); Arthur G. Schmidt, Swansea, IL (US); Richard L. Antrim, Solon, IA (US)

(73) Assignee: Grain Processing Corporation, Muscatine, IA (US)

( * ) Notice: Under 35 U.S.C. 154(b), the term of this patent shall be extended for 0 days.

(21) Appl. No.: 09/286,795

(22) Filed: Apr. 6, 1999

(51) Int. Cl.[7] ................................................. C09D 101/00
(52) U.S. Cl. .................... 106/163.01; 106/211.1; 106/215.4; 106/215.5; 428/154; 156/210; 156/291; 435/99; 435/101
(58) Field of Search ............................ 106/163.01, 211.1, 106/215.4, 215.5; 428/154; 156/210, 291; 435/99, 101

(56) References Cited

U.S. PATENT DOCUMENTS

| | | |
|---|---|---|
| 2,102,937 | 12/1937 | Bauer . |
| 5,200,215 | 4/1993 | Slade et al. . |
| 5,358,559 | 10/1994 | Fitt et al. . |
| 5,362,502 | 11/1994 | Slade et al. . |
| 5,503,668 | 4/1996 | Giesfeldt et al. . |
| 5,777,005 | 7/1998 | Giesfeldt et al. . |
| 5,855,659 | 1/1999 | Giesfeldt et al. . |
| 6,063,178 | * 5/2000 | McPherson ..................... 106/163.01 |

FOREIGN PATENT DOCUMENTS

406126715A * 5/1994 (JP) ................................. 106/164.41

* cited by examiner

*Primary Examiner*—David Brunsman
(74) *Attorney, Agent, or Firm*—Leydig, Voit & Mayer, Ltd.

(57) ABSTRACT

Disclosed is a method for the preparation of a corrugating adhesive. The method includes the steps of partially depolymerizing a hemicellulose precursor that comprises the soluble phase of an extract obtained from a hemicellulose-containing plant source, and mixing the partially depolymerized hemicellulose with starch to form an adhesive composition. The adhesive composition of the invention exhibits superior shear stability properties as compared with prior art adhesive compositions that incorporate pasted starches, and exhibits superior green tack as compared with other hemicellulose-based adhesives. Also disclosed are a corrugated board and a method for preparing same.

26 Claims, No Drawings

CORRUGATION ADHESIVE, CORRUGATED BOARD, AND PREPARATION METHODS THEREFOR

TECHNICAL FIELD OF THE INVENTION

The present invention is drawn to an adhesive composition that is useful for preparing corrugated board, a method for preparing corrugated adhesive, and a corrugated board constructed therewith.

BACKGROUND OF THE INVENTION

Corrugated board is typically prepared by a process known as the Stein-Hall process. As is generally described in U.S. Pat. No. 2,102,937 (issued to J. V. Bauer), the Stein-Hall process employs a corrugating adhesive to bond a corrugated paper "medium," such as a roll or strip, to a liner board on one or both sides of the corrugated medium. Adhesives that are used in conjunction with the Stein-Hall process long have been known, and such adhesives generally comprise an aqueous emulsion of raw starch; caustic; pasted modified or unmodified starch; and a cross-linking agent. The raw starch serves as a binder in the finished corrugated board, while the pasted starch and cross-linking agent form a tacky composition that holds the plural layers of green corrugated board together before the primary starch adhesive has set. The cross-linking of the pasted starch is further thought to impart suspending power and to affect the viscosity of the corrugating adhesive during storage and application.

Known corrugating adhesives suffer from a number of drawbacks. For example, the speed of the machinery used to prepare the corrugated board sometimes is limited by the rheological properties of the adhesive. During manufacture of corrugated board, the corrugating adhesive typically is spread across the liner board or the corrugated paper medium with a spreader knife or metering roller. It has been observed that conventional adhesives undergo substantial shear thinning when they are spread too quickly, thus leading to problems in applying the adhesive to a corrugating medium in conventional corrugating equipment. The shear thinning thus may serve to limit the speed of the corrugating equipment, and thus may limit the attainable output of corrugated board.

Another drawback relates to the green bonding strength of conventional corrugating adhesives and, more specifically, to the rate at which the tack of the adhesive increases when the corrugated board is in the green state. Typically, corrugated board is processed and handled before the adhesive has fully dried, the adhesive thus being in the green state. If the adhesive has not become tacky quickly enough, then the corrugated board will delaminate during the processing operations that follow the bonding operation. The rate of increase of tackiness of known adhesives thus may be a further limiting factor in the rate of manufacture of corrugated board.

It is believed that the Theological instability of conventional corrugating adhesives can be attributed to the exclusive reliance of the adhesive composition on pasted starch to provide tack in the green state. Recent prior art has taught to replace a portion or all of the pasted starch in the corrugating adhesive with hemicellulose, a plant derivative obtained from a hemicellulose-containing plant source such as corn hulls. For example, U.S. Pat. Nos. 5,358,559 and 5,503,668 each purport to provide a corrugating adhesive composed of starch and hemicellulose, the hemicellulose being derived from corn hulls. Similarly, U.S. Pat. No. 5,777,005 purportedly provides a corrugated starch based on a combination of corn hulls and tapioca fiber. Each of these patents teaches to blend corn hulls with starch and to extract hemicellulose in-situ from the corn hulls to provide a hemicellulose-based adhesive composition.

While such recent art purports to provide hemicellulose-containing corrugating adhesives, these adhesives are unsatisfactory in some respects. For example, the rate of increase of tack of these adhesives when in green state is unsatisfactory, thus potentially leading to delamination problems if the corrugating operation is run at too high a speed. Thus, while the rheological stability of such corrugating adhesives may be improved as compared with those of corrugating adhesives based on pasted starches, these adhesives still are of limited value in increasing the rate of production of corrugated board.

An improved hemicellulose-based adhesive, and relative advantages thereof as compared with known adhesives, are described in copending U.S. patent application Ser. No. 09/182,918, filed Oct. 30, 1998, and assigned to Grain Processing Corporation of Muscatine, Iowa. As disclosed therein, hemicellulose is obtained from the soluble phase of an extract obtained from hydrolysis of a hemicellulose-containing plant source. The hemicellulose-containing soluble phase is separated from insoluble portions of the extract and is blended with starch to form an adhesive composition. The improved hemicellulose-based adhesive described in U.S. Pat. No. 6,063,178 has significant advantages over known hemicellulose-based adhesives, such as improved green tack properties. Despite these advantages, however, even these soluble phase hemicellulose-based adhesives exhibit somewhat higher water-retention properties than is sometimes desired (albeit to a lesser degree than known hemicellulose-based adhesives). High water retention slows the rate of increase of tackiness when the corrugated board is in the green state, and thereby limits the rate of manufacture of the corrugated board.

In view of the foregoing, there exists a need in the art for a hemicellulose-based corrugating adhesive that has improved green tack property and reduced water-retention relative to conventional corrugating adhesives. The present invention provides such an adhesive. These and other advantages will be apparent from description of the inventions provided herein.

THE INVENTION

It has now been found that partially depolymerized hemicellulose may be blended with a starch to form an adhesive composition that has excellent green tack and dewatering properties. For example, the soluble phase of an extract from a hemicellulose-containing plant source in which at least a portion of the hemicellulose is partially depolymerized may be mixed with starch and optionally one or more other components to form an adhesive composition with surprisingly superior properties. The partially depolymerized hemicellulose used in the composition and method of the present invention preferably is derived from a hemicellulose-containing plant source via hydrolysis. The soluble phase is separated from other insoluble portions, is partially depolymerized, and is blended with starch to form an adhesive composition.

The adhesive composition of the present invention has superior green tack properties as compared with known adhesive compositions that rely exclusively on pasted starch for tack in the green state. Moreover, when the adhesive is in the green state in a corrugated board, the tack of the adhesive will be surprisingly improved as compared with other hemicellulose-based adhesives. The adhesive composition of the present invention exhibits superior dewatering (reduced water retention) properties over known hemicellulose-based adhesives, and even over the relatively improved hemicellulose-based adhesive described in U.S. Pat. No. 6,063,178. A higher corrugating speed is thereby made possible using the adhesive composition of the present invention. The rheological properties of the adhesive composition are surprisingly stable, and the adhesive will provide a strong adhesive bond in a corrugated board product.

In accordance with a preferred embodiment of the invention, a hemicellulose-containing plant source is substantially separated into a soluble phase and an insoluble phase. At least a portion of the hemicellulose from the soluble phase is then partially depolymerized (e.g. via chemical or enzymatic methods). The partially depolymerized hemicellulose includes or is mixed with a liquid carrier, and is mixed with starch to form a corrugating adhesive composition. The invention also encompasses a method for preparing a corrugating adhesive, a corrugated board made with the adhesive of the invention, and a method for preparing a corrugated board.

DESCRIPTION OF THE PREFERRED EMBODIMENTS

The corrugating adhesive of the invention generally comprises a liquid carrier, starch, and partially depolymerized hemicellulose, and most preferably further comprises caustic and a cross-linking agent. The liquid carrier is preferably water, but may further comprise or include polyvinyl alcohol, polyvinyl acetate, or other components as may be known in the art or found to be suitable. The invention also encompasses a dry adhesive composition to which a liquid carrier is added. Other ingredients, such as moisture resistance agents, also may be incorporated in the adhesive composition.

The partially depolymerized hemicellulose can be obtained by any suitable method, but preferably is obtained by the partial depolymerization of a soluble hemicellulose precursor. The soluble hemicellulose precursor comprises or is obtained from the hemicellulose-containing soluble phase obtained by hydrolysis of a hemicellulose-containing plant source. In accordance with a highly preferred embodiment of the invention, the partially depolymerized hemicellulose is obtained by the partial depolymerization of a soluble phase hemicellulose precursor that is substantially completely free of cellulose and other insoluble components from the plant source from which the hemicellulose is obtained, as taught in copending U.S. Pat. No. 6,063,178. As provided in more detail therein, the hemicellulose precursor most preferably is obtained from a soluble phase extracted from hydrolyzed destarched corn hulls produced by the corn wet milling industry.

In accordance with a preferred embodiment of the invention, hemicellulose is removed from the hemicellulose-containing plant source in a soluble phase. Preferably, at least a majority of the hemicellulose component of the plant source, more preferably substantially all of the hemicellulose portion, is separated from insoluble components of the plant source. For example, when the hemicellulose-containing plant source comprises corn hulls, the soluble phase preferably is extracted from the corn hulls, the extraction being conducted by heating an aqueous alkaline slurry of the corn hulls to a temperature of at least about 130° F. (54.5° C.), more preferably at least about 212° F. (100° C.), for a time sufficient to extract a substantial portion of the hemicellulose and other soluble components from the corn hulls. When the corn hull slurry is heated to boiling at atmospheric pressure, it has been found that the slurry should be heated with agitation for a time of at least about 60 minutes, more preferably at least about 80 minutes, and most preferably at least about 120 minutes, to extract the hemicellulose. This time may be substantially shortened if the corn hull slurry is cooked at higher temperatures under pressure. For example, corn hulls may be cooked at 315° F. (157° C.) at 70 psig for a time of about 5 minutes. Generally, any other reaction conditions as may be found to be suitable may be employed in conjunction with the invention.

Insolubles, for example, cellulose, are then physically removed from the reaction mixture, for example, by centrifugation. The soluble phase will contain hemicellulose and other soluble components that are believed to impart beneficial properties to the corrugating adhesive. For example, it is believed that the soluble phase will contain approximately 8% protein hydrolyzate, which is believed to contribute to the bond strength of the adhesive. The soluble phase likely will further contain other components, such as salts of fatty acids and glycerin, which are believed to decrease the surface tension of the adhesive composition. The soluble phase further will contain salts of natural acids, such as ferulic acid and coumaric acid. It should be understood that although the foregoing represents the preferred method of obtaining the hemicellulose precursor, any hemicellulose obtained via any method may be depolymerized and incorporated into an adhesive composition in connection with the invention.

After the hemicellulose precursor is obtained, the soluble hemicellulose and other soluble components of the corn hulls then may be concentrated, or water may be removed substantially completely, such as by evaporation or spray-drying, to provide a solid hemicellulose-containing soluble phase. The hemicellulose in the hemicellulose-containing soluble phase can then be depolymerized in any suitable manner as described hereinbelow, and used in accordance with the present invention. Alternatively, the hemicellulose in the hemicellulose solution may be depolymerized prior to concentration and the resulting product optionally concentrated and used to prepare the adhesive. It is further contemplated that the hemicellulose may be partially depolymerized prior to separation of the hemicellulose in a soluble phase from insoluble portions of a hydrolyzed plant source, although such is not presently contemplated to be preferred.

The hemicellulose can be partially depolymerized by any suitable method known in the art or otherwise as may be found to be suitable. The term "partially depolymerized," as used herein refers generally to the product obtained when hemicellulose is subjected to a depolymerization reaction under conditions such that a partially depolymerized hemicellulose is obtained. Partial depolymerization of cellulose and hemicellulose are known in the art and can be accomplished, for example, enzymatically or chemically. Enzymatic partial depolymerization is described, for example, in U.S. Pat. Nos. 5,200,215 and 5,362,502. Chemical partial depolymerization is described, for example, in R. L. Whistler and W. M. Curbelt, *J. Am. Chem. Soc.*, 77, 6328 (1955). The product of partial depolymerization of the hemicelllulose has not been characterized with certainty, but it is presently believed that partial depolymerization by enzymatic methods occurs via random enzymatic cleavage. It will be appreciated that the presence of the partially depolymerized hemicellulose is evidenced by the improvement in green tack bonding as compared with the hemicellulose precursor.

Preferably, the partial depolymerization reaction is carried out enzymatically. In a preferred embodiment, the hemicellulose is partially depolymerized with a xylanase enzyme, such as a xylanase that is active under acidic pH. In such case, the pH of the hemicellulose-rich soluble phase of the alkaline hydrolysate typically is undesirably high and should be adjusted to a pH at which the depolymerizing enzyme is active. When a xylanase that is active under acidic conditions is used, the xylanase is preferably one which is active in the hemicellulose-containing soluble phase below about pH 7, and is most preferably active in the hemicellulose-containing soluble phase at about pH 4.8. In a particularly preferred embodiment, the enzyme utilized in the enzymatic partial depolymerization reaction is GC-140 xylanase, which is available from Genencor International, Rochester, N.Y.

Enzymatic partial depolymerization of hemicellulose may be regulated by controlling the reaction conditions that affect the progress of the depolymerization reaction, for example, the enzyme dosage, temperature, and reaction time. Monitoring of the depolymerization reaction can be accomplished by any suitable method known in the art. For example, the rate or extent of depolymerization can be measured on the basis of viscosity, which typically decreases as the average molecular weight of hemicellulose product decreases during the partial depolymerization reaction. The viscosity (or the rate of change of viscosity over time) can be measured with a viscometer, for example, the rapid viscometer marketed by Foss Food Tech. Corp., Eden Prairie, Minn. When a rapid viscometer is used to measure viscosity, it is preferably measured at 25° C. after the solution is allowed to equilibrate thermally for about 15 minutes.

Any enzyme dosage (weight of enzyme relative to the overall weight of solution) as may be found to be suitable for depolymerizing the hemicellulose may be used in connection with the invention. For example, in one embodiment xylanase enzyme is used at a dosage ranging from about 0.1 g to about 0.3 g of xylanase per about 5000 g of hemicellulose solution obtained from a plant source. It will be appreciated that the rate and/or the extent of depolymerization achieved at one enzyme dosage can be increased by using a relatively higher enzyme dosage. In this regard, the reaction time required to achieve partial depolymerization is inversely proportional to the enzyme dosage. It will also be appreciated that the enzymatic partial depolymerization reaction can exhibit a "plateau," during the course of the enzymatic partial depolymerization reaction at which the average molecular weight of the partially depolymerized hemicellulose (as evaluated, for example, by viscosity measurements) does not substantially continue to decrease as the reaction continues. Typically, the plateau is preceded by a relatively rapid initial rate of partial depolymerization. It was found, for example, that the partial depolymerization of a soluble phase hemicellulose solution having an initial viscosity of 290 cp (measured with a rapid viscometer) exhibited a plateau at a viscosity of about 199 cp when the enzyme dosage was 0.1288 g enzyme per 5000 g of hemicellulose solution (9.4% solids). However, when an enzyme dosage of 0.2542 g enzyme per 5000 g of solution was employed under similar conditions the reaction exhibited a plateau at a solution viscosity of about 153 cp. It will thus be appreciated that a particular enzymatic reaction may reach a plateau at a different average molecular weight depending on the enzyme dosage or on the particular enzyme used. Preferably, the enzymatic partial depolymerization is allowed to proceed until the plateau is reached.

Any suitable temperature can be used. For example, when GC-140 xylanase (commercially available from Genencor International, Rochester, N.Y.) is used, the temperature is most preferably about 59° C., and the reaction time is most preferably about 4 hours when the xylanase dosage ranges from about 0.1 g to about 0.3 g of xylanase per about 5000 g of reaction solution. The enzymatic reaction can be terminated by any suitable method known in the art for inactivating an enzyme, for example, by adjusting the pH to a level at which the enzyme is rendered substantially inactive; by raising or lowering the temperature, as may be appropriate, or both. For example, inactivation of xylanases that are active at acidic pH's can be accomplished by raising the pH to about 7.2 and simultaneously raising the temperature to about 90° C.

In accordance with the invention, the partially depolymerized hemicillulose is blended with starch to form an adhesive composition. A number of starches are useful in connection with the present invention, and indeed starches such as rye, corn, potato, wheat, sorghum, and tapioca starches all are deemed useful in connection with the preparation of an adhesive composition. The starch may be present in any amount effective to impart bonding strength in the adhesive composition, but preferably is raw and unmodified starch, although starches that have been either pre-gelled or that have been modified may be found to be useful in connection with the present invention. Preferably, raw corn starch is used in connection with the corrugating adhesive of the invention. The starch is preferably present in the adhesive composition in an amount ranging from about 12% to about 35% by weight, more preferably from about 17 to about 23% by weight.

As indicated above, the reaction product containing the partially depolymerized hemicellulose can be used directly to prepare the adhesive composition of the present invention. Alternatively, the resulting mixture can be concentrated to a higher solids content, or the solution may be dried to a powder, for example, by spray-drying. The partially depolymerized hemicellulose can be present in the adhesive composition in any suitable quantity. For example, when the reaction product containing the partially depolymerized hemicellulose is used directly to prepare the adhesive, it can be present in amounts ranging from about 3% to about 50% by weight of the adhesive composition, or even greater, depending upon the other components in the composition. For example, if the composition includes pasted starch, a smaller amount of the reaction product containing the partially depolymerized hemicellulose can be used (e.g., 3–4% by weight of the composition). In general, any amount of partially depolymerized hemicellulose and optionally pasted starch that is effective to enhance tack in the green state may be employed.

The corrugating adhesive of the present invention generally further includes caustic. The caustic is preferably present in an amount sufficient to provide a pH of at least about 12.5. The caustic is preferably an alkali metal hydroxide, such as sodium hydroxide, but other caustic chemicals as may be known or found to be suitable also may be employed. When sodium hydroxide is employed, it is preferably present in an amount of about 0.1 to about 1.0% by weight of the adhesive composition, and more preferably about 0.4 to about 0.8% by weight. Typically, the amount of caustic added is less than about 1% by weight of the adhesive composition. However, it is contemplated that caustic may not need to be added to the solution if the partially depolymerized hemicellulose is obtained (or provided) in a sufficiently basic solution. Similarly, it will be appreciated that the amount of caustic needed, if any, may depend on the pH of the partially depolymerized hemicellulose, which may in turn depend on the manner in which the hemicellulose was partially depolymerized (e.g., whether by chemical or by enzymatic methods).

Optionally, and preferably, the corrugating adhesive further includes a cross-linking agent. The cross-linking agent is an optional ingredient and, when used, is preferably employed in an amount effective to enhance cross-linking of the adhesive. More preferably, the cross-linking agent is present in amounts sufficient to promote tack in green board during the manufacture of corrugated board.

Any suitable cross-linking agent can be used in connection with the present invention. Many suitable cross-linking agents are known in the art, examples of which include borax, boric acid, and borate salts (e.g., $Na_2B_4O_7 \cdot 10H_2O$). When used, the cross-linking agent preferably is present in an amount ranging from about 0.01% up to about 0.1% by weight of the adhesive composition (up to about 0.6% of the starch on a dry basis).

When moisture resistance is desired, the corrugating adhesive can include a moisture-resistance agent, which is preferably present in an amount effective to impart moisture resistance in the adhesive composition. Preferably, the moisture-resisting agent is a ketone-formaldehyde resin or a melamine-formaldehyde resin. One suitable resin is sold under the trademark AQUA-TITE™ by Grain Processing Corporation of Muscatine, Iowa. The resin or resins may be added in a total amount ranging from about 2% to about 4% (about 2–3% based on adhesive solids) in the adhesive composition. Other moisture-resistance agents as may be known in the art or as may be found to be suitable for use in connection with the invention further may be employed to impart moisture resistance.

The adhesive is preferably formulated to have a Stein-Hall viscosity of about 25 seconds to about 60 seconds at 100° F. The Stein-Hall viscosity of an adhesive is a quantity that is defined in the art as the length of time for 100 ml of an original volume of about 335 ml of the adhesive at a given temperature to exit a cylindrical vessel via a calibrated orifice having a diameter of approximately 2.73 mm and centrally located in a disc which is approximately 5.8 cm in diameter. The exact Stein-Hall viscosity of the adhesive composition may be adjusted somewhat by varying the relative amounts of starch, partially depolymerized hemicellulose, liquid carrier and other ingredients in the adhesive composition.

The manner of mixing the starch with the partially depolymerized hemicellulose is not critical and, generally, any suitable method may be employed. For example, the starch may be mixed in a single vessel with the soluble extract from corn hulls in which at least a portion of the hemicellulose has been partially depolymerized. Alternatively, the corn hulls may be extracted to provide the hemicellulose precursor as provided herein (the soluble phase having been separated from other insoluble portions) and the hemicellulose therein partially depolymerized, and the product obtained thereby added to the starch and other ingredients in a second vessel. If the partially depolymerized hemicellulose has been dried, a liquid carrier should be added. For example, when the partially depolymerized hemicellulose has been spray-dried, it may be reconstituted with a liquid carrier and added to a starch suspension in a separate tank, or the starch may be added in a single tank. Alternatively, the dry components of the adhesive composition may be supplied as a dry mix, to which warm water (typically 95°–100° F.) may be added to provide an "instant" adhesive composition. If a moisture-resistance agent is employed, it preferably is stirred into the adhesive composition during formation of the adhesive composition.

The adhesive composition of the invention may be used in a corrugated product, such as a single-facer or double-facer paper corrugated board. Methods for making corrugated board are known in the art, and conventional methods preferably are employed in conjunction with the present invention. Generally, in connection with such conventional methods the adhesives are applied to paper to form a bond between a strip of corrugated paper, called a medium, and one or two strips of flat paper, called a linerboard, which linerboard is bonded onto either one side of the corrugated medium on both sides of thereof. The bonding is effected continuously at different stations within a corrugating machine, or corrugator. At the single-face station, the medium is corrugated between heated (~360° F.) corrugated metal rolls. The corrugating adhesive is applied to the tips of the "flutes" of the corrugating medium, and then a first linerboard strip is compressed against the flute tip by another heated roll (~360° F.).

Bonding occurs with the increase in tack effected by the gelantinization of the raw starch and the dewatering of the glue line. The resulting product is referred to as single-face board. At the double-back station, corrugating adhesive is applied to the tips of the flutes of the corrugating medium on the unbonded side of the single-face board. The single-face board with adhesive-covered flute tips pointed down is then brought into contact from below with a second strip of linerboard and is held in place by compression rollers which ride atop a belt which covers and moves with the combined boxboard. Bonding occurs as the combined board is transported across a series of heated metal tables, called the hot plate section, where the adhesive exhibits an increase in tack effected by the gelatinization of the raw starch and the dewatering of the glue line. The method of manufacture of the corrugated board otherwise may be conventional or otherwise as may be found suitable. Most preferably, the corrugated board is formed into boxes after manufacture via conventional methods.

The following non-limiting examples are provided to illustrate the present invention.

Preparation of a Hemicellulose Precursor

An aqueous alkaline reaction mixture of cleaned corn hulls was prepared by adding cleaned (destarched) corn hulls to water to form a slurry at 10% solids, then adding 50% NaOH to give a ratio of NaOH to dry hulls of 1:10. The alkaline slurry was then jet-cooked at 325° F., held at that temperature for about nine minutes, cooled, and stored. The reaction mixture contained water, hemicellulose, cellulose, protein hydrolyzate, saponified fat, glycerol, phenolic acid salts, sodium acetate, and NaOH. Insolubles were removed by centrifugation, and the supernatant was concentrated to 11.6% total solids and 8.16% water soluble corn hull hemicellulose.

Alternatively, an aqueous dispersion cleaned corn hulls is hydrolyzed in the presence of sodium hydroxide by raising the temperature to at least 212° F. (100° C.) and subjecting the mixture to constant agitation at that temperature for 120 minutes. Insolubles, such as cellulose, are then physically removed from the reaction mixture by centrifugation.

Preparation of Partially Depolymerized Hemicellulose

A hemicellulose precursor was obtained in accordance with the foregoing hydrolysis at 212° F. (100° C.). After adjusting the solution to pH 4.8 with HCl, GC-140 xylanase (available from Genencor International, Rochester, N.Y.)

was added (0.1288 g per 5000 g of hemicellulose solution (9.4% solids)), the mixture carefully warmed to 59° C., and the partial depolymerization allowed to proceed for 4 hours. The enzyme was inactivated by raising the pH to 7.2 and raising the temperature to 90° C. The partially depolymerized hemicellulose product thus obtained was then concentrated to a higher solids content.

Corrugated Board and Runnability Testing of Adhesive Compositions

Films of adhesive prepared in the examples that follow were tested in the laboratory for runnability to project the relative corrugator machine speeds attainable therewith. Thin films of the adhesives prepared in the examples that follow (0.004 inches thick) were drawn down by means of a Meyer Rod and then applied to single face board by placing the single face board, flute-side down, on the thin film. The single face board was then positioned flute-side up and a piece of liner-board was positioned on the adhesive coated flutes. Application of a hot iron at 357° F. to the liner-board for as little as 5 seconds resulted in total bonding. A hot iron was applied to the liner-boards for contact times of 5 seconds, 4 seconds, 3 seconds, 2 seconds, and 1 second The tests were performed at iron temperatures of 355° F., 300° F., and 250° F. A 5-second application of heat emulates a corrugator with a 60 foot long double backer station running at 720 feet per minute. The strength of the adhesive bond was such that manual delamination of the finished boxboard resulted in 100% fiber tear from the liner. A shorter bonding time for a particular adhesive composition indicates that a faster corrugator speed is attainable therewith.

EXAMPLE 1

Corrugating Adhesive

A corrugating adhesive utilizing partially depolymerized hemicellulose in combination with pasted starch was prepared. The adhesive had the following composition:

| Component | Mass (g) | Percent by Weight of Composition |
|---|---|---|
| Water | 2964 | 66.6 |
| Raw Unmodified Starch | 1082 | 24.3 |
| Pasted Starch | 180 | 4.0 |
| NaOH | 30 | 0.7 |
| $Na_2B_4O_7 \cdot 10H_2O$ | 26 | 0.6 |
| Reaction Mixture Containing Partially Depolymerized Hemicellulose | 167 | 3.8 |

The resulting adhesive was subjected to the runnability tests described above. The results of the runnability tests are shown in Table 1.

TABLE 1

| Iron Temperature | Time (Seconds) | Bonding |
|---|---|---|
| 355° F. | 5 | |
| " | 4 | |
| " | 3 | |
| " | 2 | Excellent |
| " | 1 | Good |
| 300° F. | 5 | |
| " | 4 | |

TABLE 1-continued

| Iron Temperature | Time (Seconds) | Bonding |
|---|---|---|
| " | 3 | |
| " | 2 | Excellent-Good |
| " | 1 | Good-Fail |
| 250° F. | 5 | |
| " | 4 | Good |
| " | 3 | Good-Fail |
| " | 2 | |
| " | 1 | |

EXAMPLE 2

Corrugating Adhesive

A corrugating adhesive utilizing partially depolymerized hemicellulose and raw starch was prepared. The adhesive had the following composition:

| Component | Mass (g) | Percent by Weight of Composition |
|---|---|---|
| Water | 328 | 27.1 |
| Raw Unmodified Starch | 260 | 21.5 |
| NaOH | 9.5 | 0.8 |
| $Na_2B_4O_7 \cdot 10H_2O$ | 6.6 | 0.5 |
| Reaction Mixture Containing Partially Depolymerized Hemicellulose | 607 | 50.1 |

The resulting adhesive was subjected to the runnability tests described above. The results of the runnability tests are shown in Table 2.

TABLE 2

| Iron Temperature | Time (Seconds) | Bonding |
|---|---|---|
| 355° F. | 5 | |
| " | 4 | |
| " | 3 | Excellent |
| " | 2 | Excellent-Good |
| " | 1 | Good |
| 300° F. | 5 | |
| " | 4 | |
| " | 3 | Excellent-Good |
| " | 2 | Good |
| " | 1 | Good-Fail |
| 250° F. | 5 | Good |
| " | 4 | Good-Fail |
| " | 3 | Fail |
| " | 2 | |
| " | 1 | |

COMPARATIVE EXAMPLE 1

A corrugating adhesive that did not include partially depolymerized hemicellulose was prepared. The adhesive had the following composition:

| Component | Mass (g) | Percent by Weight of Composition |
|---|---|---|
| Water | 2964 | 69.2 |
| Raw Unmodified Starch | 1082 | 25.3 |

-continued

| Component | Mass (g) | Percent by Weight of Composition |
|---|---|---|
| Pasted Starch | 180 | 4.2 |
| NaOH | 30 | 0.7 |
| $Na_2B_4O_7 \cdot 10H_2O$ | 26 | 0.6 |

The resulting adhesive was subjected to the runnability tests described above. The results of the runnability tests are shown in Table 3.

TABLE 3

| Iron Temperature | Time (Seconds) | Bonding |
|---|---|---|
| 355° F. | 5 | |
| " | 4 | |
| " | 3 | |
| " | 2 | Good |
| " | 1 | Fail |
| 300° F. | 5 | |
| " | 4 | |
| " | 3 | Good |
| " | 2 | Good-Fail |
| " | 1 | Fail |
| 250° F. | 5 | Good |
| " | 4 | Good-Fail |
| " | 3 | Fail |
| " | 2 | |
| " | 1 | |

COMPARATIVE EXAMPLE 2

A corrugating adhesive utilizing cellulose-free hemicellulose (not depolymerized) from hydrolyzed corn hulls was prepared, in accordance with the teaching of U.S. Pat. No. 6,063,178. The hemicellulose was used in place of pasted starch. The adhesive had the following composition:

| Component | Mass (g) | Percent by Weight of Composition |
|---|---|---|
| Water | 830 | 72.4 |
| Raw Unmodified Starch | 240 | 20.9 |
| NaOH | 1.22 | 0.1 |
| $Na_2B_4O_7 \cdot 10H_2O$ | 0 | 0 |
| Hemicellulose-Containing Soluble Phase Reaction Mixture From Hydrolyzed Corn Hull Gum | 75.8 | 6.6 |

The resulting adhesive was subjected to the runnability tests described above. The results of the runnability tests are shown below in Table 4.

TABLE 4

| Iron Temperature | Time (Seconds) | Bonding |
|---|---|---|
| 355° F. | 5 | |
| " | 4 | Good |
| " | 3 | Good-Fail |
| " | 2 | Fail |
| " | 1 | |
| 300° F. | 5 | Good-Fail |
| " | 4 | Fail |
| " | 3 | |

TABLE 4-continued

| Iron Temperature | Time (Seconds) | Bonding |
|---|---|---|
| " | 2 | |
| " | 1 | |
| 250° F. | 5 | Good-Fail |
| " | 4 | Fail |
| " | 3 | |
| " | 2 | |
| " | 1 | |

Thus, it is seen that the present invention provides a corrugating adhesive that is rheologically stable, and that is useful in connection with high-speed corrugating operations. The preferred adhesives of the invention provide an excellent adhesive bond between the corrugating medium and the liner board in corrugated board. Particularly, the tack of the adhesive increases rapidly as compared with other hemicellulose-containing adhesives, and the adhesives exhibit excellent dewatering properties, thus allowing for an increase in the speed of manufacture of corrugated board.

While particular embodiments of the invention have been shown, it will be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention. All references cited herein, as is U.S. Pat. No. 6,063,178, are hereby incorporated by reference in their entireties.

What is claimed is:

1. A method for preparing an adhesive composition, said method comprising the steps of:
    hydrolyzing a hemicellulose-containing plant source by heating an alkaline aqueous suspension of said plant source to thereby form a hemicellulose-containing soluble phase and an insoluble phase;
    substantially separating said hemicellulose-containing soluble phase from said insoluble phase;
    partially depolymerizing at least a portion of the hemicellulose in said hemicellulose-containing soluble phase to produce a partially depolymerized hemicellulose-containing phase;
    optionally separating water from said partially depolymerized hemicellulose-containing phase; and
    adding starch to said partially depolymerized hemicellulose-containing phase in the presence of a liquid carrier under alkaline pH conditions to thereby form an adhesive composition.

2. A method according to claim 1, further comprising the step of adding a cross-linking agent to said starch and said partially depolymerized hemicellulose-containing phase in the presence of a liquid carrier under alkaline pH conditions to thereby form an adhesive composition.

3. The method according to claim 2, wherein said cross-linking agent is a borate.

4. The method according to claim 1, wherein said method further comprises the step of drying said partially depolymerized hemicellulose-containing phase prior to adding said starch to said partially depolymerized hemicellulose-containing phase.

5. The method according to claim 4, wherein said drying comprises spray-drying.

6. The method according to claim 1, wherein said plant source comprises corn hulls.

7. The method of claim 1, wherein said hemicellulose is partially depolymerized with an enzyme.

8. The method of claim 7, wherein said enzyme is a xylanase.

9. A corrugating adhesive composition made by the method of claim 1.

10. A method for preparing a corrugated board, the method comprising the step of bonding corrugated medium to a liner board with the adhesive composition of claim 9.

11. A corrugated board prepared by the method of claim 10.

12. A method for preparing an adhesive composition, said method comprising the steps of:

providing a hemicellulose;

partially depolymerizing at least a portion of said hemicellulose to produce a partially depolymerized hemicellulose; and adding starch to said partially depolymerized hemicellulose in the presence of a liquid carrier under alkaline pH conditions to thereby form an adhesive composition.

13. The method of claim 12, wherein said hemicellulose is partially depolymerized with an enzyme.

14. The method of claim 13, wherein said enzyme is a xylanase.

15. A corrugating adhesive composition made by the method of claim 12.

16. A method for preparing a corrugated board, the method comprising the step of bonding corrugated medium to a liner board with the adhesive composition of claim 15.

17. A corrugated board prepared by the method of claim 16.

18. A method for preparing an adhesive composition, the method comprising the steps of:

extracting hemicellulose from a hemicellulose-containing plant source by heating said plant source in an aqueous carrier at a temperature of at least about 200° F. under alkaline conditions to form a hemicellulose solution;

separating insoluble components from said hemicellulose solution to form a hemicellulose-rich phase;

partially depolymerizing at least a portion of the hemicellulose in said hemicellulose-rich phase to produce a partially depolymerized hemicellulose-rich phase; and mixing said partially depolymerized hemicellulose-rich phase with starch to form an adhesive composition.

19. The method of claim 18, wherein said hemicellulose is partially depolymerized with an enzyme.

20. The method of claim 19, wherein said enzyme is a xylanase.

21. A corrugating adhesive composition made by the method of claim 18.

22. A method for preparing a corrugated board, the method comprising the step of bonding corrugated medium to a liner board with the adhesive composition of claim 21.

23. A corrugated board prepared by the method of claim 22.

24. An adhesive composition comprising water; caustic; starch; and the extracted soluble phase of a hemicellulose-containing plant source, at least a portion of the hemicellulose in said hemicellulose-containing plant source being partially depolymerized.

25. An adhesive according to claim 24, wherein said adhesive further includes a moisture resistance agent.

26. An adhesive according to claim 25, wherein said moisture resistance agent is a ketone-formaldehyde resin.

* * * * *

UNITED STATES PATENT AND TRADEMARK OFFICE
CERTIFICATE OF CORRECTION

PATENT NO. : 6,179,905 B1
DATED : January 30, 2001
INVENTOR(S) : McPherson et al.

It is certified that error appears in the above-identified patent and that said Letters Patent is hereby corrected as shown below:

Title page,
Column 2,
After "FOREIGN PATENT DOCUMENTS" add heading "OTHER DOCUMENTS" and add "Whistler, R. L. et al., Starch: Chemistry and Technology, 2$^{nd}$ Edition, Chapter XX, pp. 596-607, Academic Press, Inc. (New York, 1984)."

Column 1,
Line 57, change "Theological" to -- rheological --.

Signed and Sealed this

Twentieth Day of November, 2001

*Attest:*

*Attesting Officer*

NICHOLAS P. GODICI
*Acting Director of the United States Patent and Trademark Office*